United States Patent
Trewella et al.

(10) Patent No.: US 9,534,181 B2
(45) Date of Patent: Jan. 3, 2017

(54) METHOD OF USING RENEWABLE FUEL COMPOSITION

(71) Applicant: KiOR, Inc., Pasadena, TX (US)

(72) Inventors: Jeffrey C. Trewella, Kennett Square, PA (US); Daniel J. Strope, Houston, TX (US); John Kasbaum, Taylor Lake Village, TX (US); Stephen J. McGovern, Mantua, NJ (US); Vicente Sanchez, Houston, TX (US)

(73) Assignee: INAERIS TECHNOLOGIES, LLC, Pasadena, TX (US)

( * ) Notice: Subject to any disclaimer, the term of this patent is extended or adjusted under 35 U.S.C. 154(b) by 0 days.

(21) Appl. No.: 13/841,208

(22) Filed: Mar. 15, 2013

(65) Prior Publication Data

US 2013/0333652 A1    Dec. 19, 2013

Related U.S. Application Data

(63) Continuation-in-part of application No. 13/527,274, filed on Jun. 19, 2012.

(51) Int. Cl.
| | | |
|---|---|---|
| *C10L 1/04* | (2006.01) | |
| *C10L 1/00* | (2006.01) | |
| *C10L 1/06* | (2006.01) | |
| *C10L 1/08* | (2006.01) | |

(52) U.S. Cl.
CPC .. *C10L 1/04* (2013.01); *C10L 1/00* (2013.01); *C10L 1/06* (2013.01); *C10L 1/08* (2013.01); *C10L 2200/0484* (2013.01); *C10L 2200/0492* (2013.01); *C10L 2230/00* (2013.01); *Y02E 50/10* (2013.01); *Y02E 50/13* (2013.01)

(58) Field of Classification Search
CPC ............... C10L 2200/0484; C10L 2200/0492; C10L 2230/00
USPC .................................... 585/1, 13, 14, 16, 240
See application file for complete search history.

(56) References Cited

U.S. PATENT DOCUMENTS

| | | | |
|---|---|---|---|
| 5,820,640 | A | 10/1998 | Ikura et al. |
| 7,638,314 | B2 | 12/2009 | Zappi et al. |
| 7,819,930 | B2 | 10/2010 | Adams et al. |
| 8,063,258 | B2 | 11/2011 | Bartek et al. |
| 8,119,847 | B2 * | 2/2012 | Dindi et al. ................. 585/240 |
| 7,279,018 | C1 | 7/2012 | Jakkula et al. |

(Continued)

FOREIGN PATENT DOCUMENTS

| | | |
|---|---|---|
| GB | 2399571 A | 9/2004 |
| WO | 2009014859 A1 | 1/2009 |

(Continued)

OTHER PUBLICATIONS

Richard Bain, "Biodiesel and Other Renewable Diesel Fuels", publication, National Renewable Energy Laboratory, Nov. 2006.

(Continued)

*Primary Examiner* — Ellen McAvoy
(74) *Attorney, Agent, or Firm* — John Wilson Jones

(57) ABSTRACT

Disclosed is an alternative fuel composition derived from the conversion of biomass at an elevated temperature, with conversion optionally in the presence of a catalyst, which is capable of reducing, and thereby improving, a low temperature property of a distillate. A process is also disclosed for mixing such renewable composition with the distillate.

36 Claims, 1 Drawing Sheet

(56) References Cited

U.S. PATENT DOCUMENTS

| | | | |
|---|---|---|---|
| 8,277,643 B2* | 10/2012 | Huber | C10G 1/002 208/400 |
| 8,288,600 B2 | 10/2012 | Bartek et al. | |
| 8,324,438 B2* | 12/2012 | Brandvold et al. | 585/240 |
| 8,329,967 B2* | 12/2012 | Brandvold et al. | 585/240 |
| 8,329,968 B2* | 12/2012 | Brandvold et al. | 585/240 |
| 8,329,969 B2 | 12/2012 | McCall et al. | |
| 8,350,103 B2* | 1/2013 | Roberts et al. | 585/240 |
| 8,377,152 B2 | 2/2013 | Ramirez Corredores et al. | |
| 8,450,541 B2 | 5/2013 | Seames et al. | |
| 8,454,712 B2 | 6/2013 | Ramirez Corredores et al. | |
| 8,471,079 B2 | 6/2013 | Brandvold et al. | |
| 8,471,081 B2 | 6/2013 | McCall | |
| 8,506,658 B2 | 8/2013 | Corredores et al. | |
| 8,546,635 B1 | 10/2013 | Brandvold et al. | |
| 8,637,717 B2* | 1/2014 | Mackay et al. | 585/240 |
| 8,704,020 B2 | 4/2014 | Roberts et al. | |
| 8,754,275 B2* | 6/2014 | Brandvold et al. | 585/240 |
| 8,772,557 B2* | 7/2014 | Chen et al. | 585/240 |
| 8,772,558 B2* | 7/2014 | Chen | 585/240 |
| 8,927,795 B2 | 1/2015 | McCall et al. | |
| 2009/0000185 A1* | 1/2009 | Aulich | C10G 2/32 44/308 |
| 2009/0166256 A1 | 7/2009 | Lewis et al. | |
| 2009/0234030 A1 | 9/2009 | Gouman et al. | |
| 2009/0250376 A1 | 10/2009 | Brandvold et al. | |
| 2009/0253948 A1 | 10/2009 | McCall et al. | |
| 2009/0301930 A1 | 12/2009 | Brandvold | |
| 2010/0064574 A1 | 3/2010 | de Almeida et al. | |
| 2011/0126449 A1 | 6/2011 | Xu et al. | |
| 2011/0138681 A1 | 6/2011 | Ramirez Corredores et al. | |
| 2011/0155631 A1 | 6/2011 | Knuuttila et al. | |
| 2011/0259793 A1 | 10/2011 | Umansky et al. | |
| 2011/0282118 A1 | 11/2011 | Shih | |
| 2012/0005949 A1* | 1/2012 | Stevens | C10G 1/002 44/307 |
| 2012/0101318 A1 | 4/2012 | Ramirez Corredores et al. | |
| 2012/0152801 A1* | 6/2012 | Bozzano et al. | 208/17 |
| 2012/0172643 A1 | 7/2012 | Ramirez Corredores et al. | |
| 2012/0216448 A1 | 8/2012 | Ramirez Corredores et al. | |
| 2012/0266838 A1 | 10/2012 | Gosselink et al. | |
| 2012/0289752 A1 | 11/2012 | Gosselink et al. | |
| 2012/0304530 A1* | 12/2012 | Chitta | C10G 3/44 44/307 |
| 2013/0174476 A1 | 7/2013 | Ramirez Corredores et al. | |
| 2013/0305591 A1 | 11/2013 | McCall et al. | |
| 2014/0027265 A1* | 1/2014 | Mazanec | C10K 1/04 201/2.5 |
| 2014/0031583 A1* | 1/2014 | Mazanec | C10G 1/002 562/521 |
| 2014/0288338 A1* | 9/2014 | Radlein | C10G 3/44 585/251 |

FOREIGN PATENT DOCUMENTS

| | | |
|---|---|---|
| WO | 2009082366 A1 | 7/2009 |
| WO | 2009126508 A1 | 10/2009 |
| WO | 2010002886 A1 | 1/2010 |
| WO | 2010135734 A1 | 11/2010 |
| WO | 2011143396 A2 | 11/2011 |

OTHER PUBLICATIONS

MathRop, "An Introduction to Petroleum Refining and the Production of Ultra Low Sulfur Gasoline and Diesel Fuel", publication, Mathrpo, Inc. 2011.

Roger Leisenring, "Starndard Specification for Diesel Fuel Oils", publication, ASTM International, Pennsylvania, Jan. 2012.

"HM 40 Guidelines for the Crude Oil Washing of Ships' Tanks and the Heating of Crude Oil Being Transported by Sea", publication, Energy Institute, London, Jun. 2004.

Zhang Qi, Chang Jie, Wang Tiejun, Xu Ying, "Review of Biomass Pyrolysis Oil Properties and Upgrading Research", Energy Conversion and Management, p. 87-92, vol. 48, Guangzhou Institute of Energy Conversion, China 2007.

Vicente Sanchez, Leslie May, John Kasbaum, Dan Strope, Jeffrey Trewella, Properties of Gasoline and Biofuels Containing Renewable Drop-In Biofuel Blend Stocks Prepared by the Thermo-Catalytic Conversion of Lignocellulose, 2012 IASH Conference Presentation, KiOR, Inc. and Petro Tech Consultants LLC, Texas 2012.

Vicente Sanchez, Ramon Bonaquest Jeffrey Trewella, "Renewable Fuel Bi-products Potential Use in Asphalt", 2012 AAPT Annual Meeting Presentation, KiOR Inc., Texas 2012.

M. Garcia-Perez, J. Shen, X.S. Wan, C.F. Li, "Production and Fuel Properties of Fast Pyrolysis Oi/Bio-Diesel Blends", Fuel Processing Technology 91 (3), p. 296-305, 2010.

U.S. Appl. No. 13/964,873, filed Aug. 12, 2013; inventor: Ramirez Corredores et al.

* cited by examiner

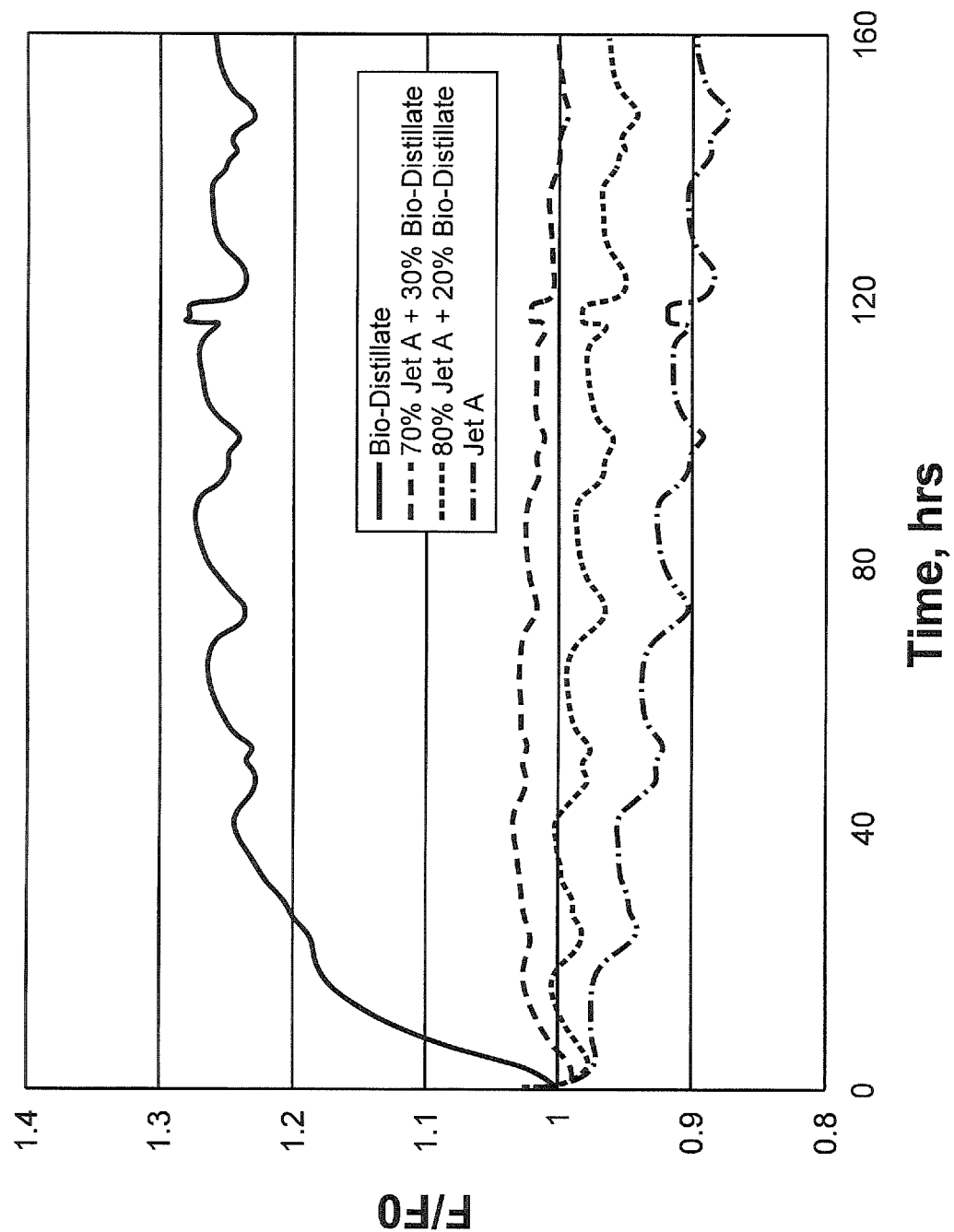

METHOD OF USING RENEWABLE FUEL COMPOSITION

This application is a continuation-in-part application of U.S. patent application Ser. No. 13/527,274, filed on Jun. 19, 2012.

FIELD OF THE DISCLOSURE

The disclosure relates to a distillate fuel having an aromatic-lean component and an aromatic-rich component and to a method of using the distillate fuel. The disclosure also relates to a composition capable of reducing a low temperature property of a distillate fuel, and a process for blending the composition with the distillate fuel. The disclosure further relates to a bio-distillate composition having at least 40 wt % cycloparaffins.

BACKGROUND OF THE DISCLOSURE

With rising costs and environmental concerns associated with fossil fuels, renewable energy sources have become increasingly important. Renewable energy sources are low in aromatic content and provide a substitute for fossil fuels and a means of reducing dependence on petroleum oil. There is a growing interest in the use of aromatic lean biofuels as renewable transportation fuels.

Renewable energy sources include biofuels. Biofuels may be produced from a biomass feedstock to render pyrolysis oil (which is relatively soluble in water) and bio-oil. Biomass may also be gasified, subjected to a Fischer-Tropsch synthesis and fractionated to render low aromatic components. In addition, triglycerides may be extracted from crops or algal sources and then deoxygenated to provide renewable fuel blending components with low aromatic content. Each of these renewable energy sources may be fractionated such that one or more fractions fit into a traditional and desirable fuel boiling point range.

In addition to being used to produce a renewable energy source, a Fischer-Tropsch process may also be used to produce an aromatic lean component as a substitute for fossil fuel. Exemplary of such non-renewable distillates are non-oxygenated feedstocks (which may be derived from gasification of coal or natural gas) subjected to a Fischer-Tropsch process downstream.

All of these low aromatic distillates lack important fuel properties. For instance, refined petroleum distillate fuels need to exhibit low temperature properties in order to be suitable for the area and season in which they are to be used. For instance, when the temperature drops below the cloud point of the distillate fuel, operating difficulties may appear due to wax crystal dropout. Such operating difficulties can include the plugging of fuel filters and fuel lines. The consequences may be catastrophic. For instance, in the case of jet fuel distillate fuels, fuel filter plugging can lead to an interruption of fuel flow to the turbine engines.

The low temperature property of a distillate fuel can be reduced to some extent by adding a product with a lower wax content, such as a low wax heating oil or kerosene, or by using cold flow improver additives, which can be expensive depending on the required level of low temperature property suppression.

However, as stated above, some renewable fuels such as some bio-distillates and some Fischer-Tropsch hydrocarbons are themselves in need of an additive or admixture of some kind to reduce/suppress their low temperature properties and thereby extend their useful operating range to lower temperatures.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

In an aspect, there remains a need for a fuel which is aromatic lean and which may be used as an alternative to fossil fuels. Such alternative fuels need to substantially exhibit the properties of fossil fuels.

In another aspect, there remains a need for a composition produced from a renewable source, and process of using such, which is capable of reducing low temperature properties of distillates.

In still another aspect, there exists a need for improved distillate fuels having one or more of the attributes or capabilities described or shown in, or as may be apparent from, the other portions of this patent.

SUMMARY OF THE DISCLOSURE

In an embodiment of the disclosure, a distillate fuel is provided which contains:
a) an aromatic-lean component selected from the group consisting of:
 (i) a renewable distillate produced by a Fischer-Tropsch process;
 (ii) a non-renewable distillate produced by a Fischer-Tropsch process; and
 (iii) a renewable component of a hydroprocessed/hydrotreated triglyceride or triglyceride derived fatty acid alkyl ester; and
b) an aromatic-rich component comprising an at least partially hydrotreated bio-distillate fraction produced from the conversion of biomass at an elevated temperature wherein the boiling range of the aromatic-lean component and the aromatic-rich component are about the same.

In another embodiment, the disclosure relates to a distillate fuel containing:
a) an aromatic-lean component selected from renewable and non-renewable distillates produced by a Fischer-Tropsch process or a renewable component of a hydroprocessed/hydrotreated triglyceride or triglyceride derived fatty acid alkyl ester; and
b) an aromatic-rich component comprising an hydrotreated bio-distillate fraction produced from the conversion of biomass at an elevated temperature wherein the boiling range of the aromatic-lean component and the aromatic-rich component are about the same and wherein the following conditions prevail:
 (i) the amount of aromatic hydrocarbons in the aromatic-rich component is from about 30 percent to about 50% and the amount of aromatic hydrocarbons in the aromatic-lean component is less than 20%;
 (ii) the amount of aromatic-rich component in the distillate fuel is from about 10% to about 50%.

In another embodiment, the disclosure relates to a distillate fuel containing:
a) an aromatic-lean component selected from the group consisting of (i) a renewable distillate produced by a Fischer-Tropsch process; (ii) a non-renewable distillate produced by a Fischer-Tropsch process; and (iii) a renewable component of a hydroprocessed/hydrotreated triglyceride or triglyceride derived fatty acid alkyl ester; and b) an aromatic-rich component comprising a hydrotreated bio-distillate fraction produced from the conversion of biomass at an elevated temperature wherein the distillate fuel meets the specifications of ASTM D4814, or D975, or D7566.

In another embodiment of the disclosure, a distillate mixture is provided which contains:

(a) a first component selected from the group consisting of: a petroleum distillate, distillate range hydrocarbons produced by a Fischer-Tropsch process, and mixtures thereof, the first component having a low temperature property value; and (b) a second component comprising an at least partially hydrotreated bio-distillate fraction produced from the conversion of biomass at an elevated temperature; wherein the distillate mixture has a low temperature property value which is lowered as compared to the low temperature property value of the first component.

In accordance with another embodiment of the disclosure, a bio-distillate composition is provided which boils in the range of from about 320 to about 700° F. and comprises: (a) at least about 40 wt % cycloparaffins, and b) less than about 5 wt % n-paraffins and iso-paraffins; wherein the bio-distillate composition has been at least partially hydrotreated.

In another embodiment of the disclosure, a low temperature property improving composition is provided comprising a bio-distillate fraction produced from the thermo-catalytic conversion of a biomass, wherein the bio-distillate fraction has been at least partially hydrotreated; and wherein the low temperature property improving composition is capable of improving a low temperature property of a distillate component selected from the group consisting of: a petroleum distillate, distillate range hydrocarbons produced by a Fischer-Tropsch process, and mixtures thereof.

Accordingly, the present disclosure includes features and advantages which are believed to be useful as a distillate fuel. In addition, the present disclosures includes features and advantages which are believed to useful in improving low temperature properties of distillates. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 1 summarizes nitrile O-ring stress relaxation using a distillate fuel described herein.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

Certain terms are used herein and in the appended claims to refer to particular components. Thus, the component of each such reference should not be considered as necessary for, or part of, every embodiment hereof or of any particular claim(s) merely because of such reference. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . . " Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The distillate fuel described herein can comprise, consist of, or consist essentially of:

a) a first component which is aromatic lean; and a b) second component which is aromatic rich.

The distillate fuel may be used as a liquid fuel or to produce liquid fuels suitable for internal combustion engines.

Typically, the amount of aromatic-rich component in the distillate fuel feed is from about 10% to about 50%.

The amount of aromatic hydrocarbons in the aromatic-lean component is typically less than 20%.

In an embodiment, the aromatic lean component may be hydrocarbons of a non-renewable distillate, such as a non-renewable distillate produced by a Fischer-Tropsch process, a renewable distillate and mixtures thereof.

In another embodiment, the aromatic-lean component may be a renewable component of a hydroprocessed/hydrotreated triglyceride or triglyceride derived fatty acid alkyl ester produced by a Fischer-Tropsch process and mixtures thereof. As used herein, the term renewable distillate is meant to include distillates other than those obtained directly from petroleum or fossil sources including crude oil, coal, shale, lignite and the like.

In one preferred embodiment, the aromatic-lean component is a petroleum distillate, such as a petroleum distillate having a boiling point range of from about 122 to about 375° F.; a petroleum distillate having a boiling point range of from about 340 to about 550° F.; and a petroleum distillate having a boiling point range of from about 540 to about 700° F.

The non-renewable aromatic-lean component may include non-oxygenated liquids derived from gasification of a petroleum source (including heavy oils) shale oil, natural gas, coal, bitumen from tar sand, as well as waste materials, including plastics. The products resulting from gasification are a syngas rich in hydrogen and carbon monoxide. The rich mixture of hydrogen and carbon monoxide may then be catalytically converted to aromatic-lean liquids by a Fischer-Tropsch synthesis and then subjected to fractionation.

A renewable component from a Fischer-Tropsch synthesis may also be used as the aromatic-lean component. Such distillates may be converted from biomass, peat, lignin, including those described above, and converted to a syngas rich in hydrogen and carbon monoxide which is then subjected to a Fischer-Tropsch synthesis and fractionation.

In another preferred embodiment, the aromatic-lean component is a renewable component of a hydroprocessed/hydrotreated triglyceride or a triglyceride derived fatty acid alkyl ester. The triglyceride can be obtained from a renewable resource and include vegetable or plant fats and oils, animal fats and oils, and mixtures thereof. Suitable vegetable, plant fats and oils include rapeseed oil, soybean oil, palm oil, corn oil, coconut oil, cottonseed oil, peanut oil, safflower oil, linseed oil, tung oil, castor oil, sunflower oil, meadowfoam oil, algal oil, and mixtures thereof. Animal fats and oils include lard, lard oil, tallow, various fish oils, and mixtures thereof.

The triglyceride derived fatty acid alkyl ester can be derived from at least one triglyceride, such as those set forth above, by transesterification of the triglyceride with an alcohol. In an embodiment of the invention the alcohol is at least one monohydric alcohol. The alcohol can be linear, branched, cyclic, or a mixture thereof. The alcohol can have 1 to 22 carbon atoms, and in other instances can have 1 to 18 carbon atoms, and 1 to 10 carbon atoms. Useful alcohols for transesterifying naturally occurring triglycerides include methanol, ethanol, propanol and butanol. The transesterification can be done using either an acid or base catalyst. Acid catalysts include dry hydrogen chloride and sulfuric acid. Base catalysts include alkali metal and alkaline earth metal alkoxides such as sodium methoxide, alkali metal hydroxides such as potassium hydroxide, and titanium alkoxides such as titanium tetraisopropoxide. The transesterification is generally run using an excess of the alcohol reactant and/or removing one of the products to drive the reaction toward completion. The fatty carboxylic acid esters from the transesterification of the triglyceride are usually isolated from the glycerol by-product and any excess alcohol reactant by physical separation and distillation or fractional distillation.

The triglyceride derived fatty acid ester may also be derived from at least one triglyceride, such as those set forth above, by esterification of one or more fatty carboxylic acids obtained from at least one naturally occurring triglyceride. A fatty carboxylic acid or mixture of fatty carboxylic acids can be obtained from naturally occurring triglycerides by a saponification process and are commercially available. The fatty carboxylic acid or mixture of acids, obtained by saponification of at least one naturally occurring triglyceride, can be saturated, unsaturated to include mono- and polyunsaturates, or a mixture thereof. The fatty carboxylic acid or mixture of acids can be linear, branched or a mixture thereof, but usually they are linear. The fatty carboxylic acid or mixture of acids can have 4 to 24 carbon atoms, and in other instances 8 to 22 carbon atoms, and 10 to 22 carbon atoms. The fatty carboxylic acid or mixture of acids can be esterified with an excess of an alcohol, where the alcohol is as described above for the transesterification of a triglyceride, using an acid catalyst such as sulfuric acid and removing the water by-product by azeotropic distillation usually with an aromatic solvent. The sulfuric acid catalyst in the crude product can be neutralized, and the ester or esters can be recovered by fractional distillation.

The triglycerides and triglyceride derived fatty acid alkyl esters are typically hydroprocessed (including hydrotreating) by treating them with hydrogen. Hydroprocessing conversion temperatures are typically between from about 600 to about 700 F, at pressure typically from about 40 to about 100 atm at reaction times from about 10 to about 60 minutes. Solid catalysts are typically used to increase reaction rates, improve selectivity for the desired product and to optimize hydrogen consumption. Triglyceride containing oils are typically reduced to four hydrocarbon molecules under such hydroprocessing conditions, typically propane and three hydrocarbon molecules in the C12 to C18 range. The C12 to C18 hydrocarbon molecules may be further hydroprocessed under hydrocracking and/or hydroisomerization conditions to improve low temperature properties.

Renewable and non-renewable components of the distillate fuel may contain a variety of impurities including metals which may be removed by ion-exchange resin in a hydroprocessing reactor pretreatment zone at pretreatment conditions, by contacting the feedstock with a bleaching earth, such as bentonite clay, in a pretreatment zone or by subjecting the feedstock to a mild acid wash.

In an embodiment, the amount of aromatic hydrocarbons in the aromatic-rich component may be between from about 30% to about 50%. The second component of the distillate fuel which is rich in aromatic content may be comprised of an at least partially hydrotreated bio-distillate fraction. Such bio-distillate reactions may be produced from the conversion of biomass at an elevated temperature.

The biomass material can be any biomass capable of being converted to liquid and gaseous hydrocarbons.

Solid biomass materials comprising a cellulosic material, in particular lignocellulosic materials are useful because of the abundant availability of such materials, and their low cost. The solid biomass feed can comprise components selected from the group comprising lignin, cellulose, hemicelluloses, and combinations thereof. Examples of suitable solid biomass materials include plantation wood crops such as Southern Yellow Pine, forestry wastes, such as wood chips and saw dust; agricultural waste, such as straw, corn stover, sugar cane bagasse, municipal waste, in particular yard waste, paper, and card board; energy crops such as switch grass, coppice, eucalyptus, giant miscanthus; and aquatic materials such as algae; and the like.

The biomass can be converted at elevated temperatures to form a conversion reactor effluent. In particular, the biomass can be converted in a conversion reactor containing a heat carrier material to thereby produce the conversion reactor effluent comprising vapor conversion products and heat carrier material. The conversion reactor effluent can also include unreacted biomass, coke, or char. The vapor conversion products comprise, consist of, or consist essentially of non-condensable gases including CO and $CO_2$, bio-oil, and water. The conversion reactor can be operated at a temperature in the range of from about 390° F. to about 1850° F., or between about 480° F. and about 1475° F., and can be operated in the substantial absence of oxygen. At least a portion of the heat carrier can be a catalyst.

Such catalyst can be any catalyst capable of converting biomass to a bio-oil product having relatively low oxygen levels. The oxygen levels of such bio-oil can be less than about 20 wt % on a dry basis.

More particularly, useful catalysts for the current invention include those containing catalytic acidity and can contain a zeolite. Examples of suitable zeolites include ZSM-5, ZSM-11, ZSM-22, ZSM-23, ZSM-48, mordenite, beta, ferrierite, and zeolite-Y. Additionally, the catalyst may comprise a super acid, including sulfonated, phosphated, or fluorinated forms of zirconia, titania, alumina, silica-alumina, or clays, pillared layered clays and/or silicotitanates or pillared layered silicotitanates. In another embodiment, the catalyst may comprise a solid base including metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

At least a portion of the vapor conversion products, from either or both of a catalytic or non-catalytic conversion process as described above, can be separated from the conversion reactor effluent, and at least a portion of the vapor conversion products thus separated can be condensed to form a condensate comprising bio-oil and water.

When the heat carrier does not include a catalyst component, the condensate can first be at least partially hydrotreated in order to make the resulting hydrotreated condensate more susceptible to separation. At least a portion of the bio-oil can then be separated from the hydrotreated condensate, also forming an aqueous phase.

When the heat carrier includes the catalyst as described above, at least a portion of the bio-oil can be separated from the condensate, without the necessity of prior hydrotreatment, also forming an aqueous phase.

In either case, such separation can be by any method capable of separating bio-oil from an aqueous phase, and can include, but is not limited to, centrifugation, membrane separation, gravity separation, and the like. In a specific embodiment, the condensate is separated by gravity separation in a settling vessel into the bio-oil and into the aqueous phase.

The term "at least partially hydrotreated", as used herein, includes the removal of at least 80, or at least 90, or at least 95, or at least 99, or at least 100% of the oxygen contained in carbon-hydrogen-oxygen containing compounds, from whatever source, which are subjected to hydrotreatment. Further, products which are at least partially hydrotreated as described herein can comprise less than about 1, or less than about 0.5, or less than about 0.1 wt % oxygen; and/or optionally less than about 20, or less than about 5 ppm sulfur. Any hydrotreatment referred to herein can be accomplished using either a batch or a continuous process.

Thus, the aromatic-rich component of the distillate fuel can be at least partially hydrotreated to form an at least partially hydrotreated bio-oil. Such at least partially hydrotreated bio-oil can then be fractionated to render an aromatic-rich component which may have a boiling point ranging from about Initial Boiling Point (IBP) to about 320° F. to about 375° F., or from about 320 to about 700° F., or from about 330 to about 550° F., or from about 540 to about 700° F.

In an embodiment, the distillate fuel boiling range of the aromatic-lean component and the aromatic-rich component are about the same. As an example, the boiling range of both aromatic-lean and aromatic-rich components of the distillate fuel may be in the range of from about IBP to about 320° F. (meeting ASTM D4814 specifications for gasoline); the boiling range of both aromatic-lean and aromatic-rich components of the distillate fuel may be in the range from about 330 to about 550° F. (meeting ASTM D7566 specifications for jet fuel); or the boiling range of both aromatic-lean and aromatic-rich components of the distillate fuel may from about 320 to about 700° F. (meeting ASTM D975 specifications for diesel fuel).

In accordance with an embodiment of the invention, the aromatic-lean component can have a boiling point ranging from about IBP to about 320° F. to about 375° F., or from about 320° F. to about 700° F., or from about 340° F. to about 550° F., or from about 540° F. to about 700° F.

In accordance with an embodiment of the invention, the first component (the aromatic-rich) can have a boiling point ranging from about IBP to about 320° F. to about 375° F., or from about 320 to about 700° F., or from about 330 to about 550° F., or from about 540 to about 700° F. Thus, the aromatic-lean component may have a boiling point range of from about 320 to about 700° F., and the aromatic-rich component has a boiling point range of from about 320 to about 700° F. Alternatively, the aromatic-lean component may have a boiling point range of from about 330 to about 550° F., and the aromatic-rich component has a boiling point range of from about 330 to about 550° F. Still, the aromatic-lean components may have a boiling point range of from about 480° F. to about 660° F., and the aromatic-rich component may have a boiling point range of from about 480° F. to about 660° F.

In an embodiment, the energy density (in BTU/gal) of the distillate fuel containing the aromatic-rich component and the aromatic-lean component is greater than the energy density (BTU/gal) of the aromatic-lean component.

Further, the distillate fuel containing the aromatic-rich component and the aromatic-lean component provides improved lubricity performance over the distillate fuel containing only the aromatic-lean component. As such, wear caused on friction-inducing objects is decreased by use of the distillate fuel containing the aromatic component and the aromatic-lean component.

A further benefit recognized by the addition of the aromatic-rich component to an aromatic-lean component as described is an increase in swelling of rubber gasket seals, such as nitrile rubber elastomers, fluorosilicones and fluorocarbon elastomers. Seal swelling typically results from the swelling of the elastomers. Insufficient swelling of elastomer seals and O-rings enhances the possibility of fuel leaks in the fuel system. In addition, lack of swelling causes brittleness and degradation of the gaskets and thus presents an issue to dispensing equipment during dispensing of the fuel into an internal combustion engine. By maintaining the expansion of the elastomer and swelling of the seal, the distillate fuels described herein help maintain fuel system hydraulic pressure, minimize the harm to dispensing equipment and helps minimize lubricant contamination and fuel loss.

Depending upon the application, various additives may be combined with the fuel composition generated in order to meet required specifications for different specific fuels.

In an embodiment, the aromatic lean component has a low temperature property.

The second component can have a low temperature property value which is superior to the low temperature property value of the first component, and the low temperature property can be selected from the group consisting of cloud point, pour point, cold flow plugging point, and low temperature flow test performance.

The at least partially hydrotreated bio-distillate fraction can have a cloud point below about −20° F., or below about −40° F., or below about −60° F.

Further, the distillate mixture of the aromatic rich and the aromatic lean components has a low temperature property value which is improved as compared to the low temperature property value of the aromatic lean component.

When the low temperature property is the cloud point; the cloud point value of the distillate mixture is lower than that predicted by the below described cloud point prediction method for calculating the cloud point of a mixture of fuel components. The method is published in "Fundamentals of Petroleum Refining" by M. A. Fahim et.al, Chapter 9, Section 9.5 starting on page 244, and sets forth a cloud point mixture prediction equation for multiple distillate blendstock components as follows:

$$CP_{mixture}=(BI_{mixture})^{(1/0.05)}$$

wherein $CP_{mixture}$ is the predicted cloud point of the mixture in °K and the blend index (BI) of the mixture is the volume fraction weighted average of the BI of each component in the mixture, $BI_i$, and is calculated as follows:

$$BI_{mixture}=\Sigma_i(\text{Volume Fraction})_i \times BI_i,$$

and the BI of each component, i, is calculated as follows:

$$BI_i=(CP_i)^{0.05}$$

wherein $CP_i$ is the measured cloud point in °K of component i.

The distillate mixture has a measured cloud point suppression value which is equal to the difference between the cloud point of the first component and the cloud point of the distillate mixture. Unexpectedly, the measured cloud point suppression value can be at least two times greater than the cloud point suppression value predicted by the cloud point prediction method set out above.

The second component can be present in the distillate mixture in an amount of at least about 5 wt %, which can result in a lowering of the cloud point of such a distillate mixture by at least about 3° F., or at least about 4° F., or at least about 5° F.

The second component can also be present in the distillate mixture in an amount of at least about 10 wt %, which can result in a lowering of the cloud point of such a distillate mixture by at least about 5° F.

The second component can also be present in the distillate mixture in an amount of at least about 15 wt %, which can result in a lowering of the cloud point of such a distillate mixture by at least about 7° F.

In accordance with another embodiment of the invention, a bio-distillate composition, which has been at least partially hydrotreated and boils in the range of from about 320 to about 375° F., 320 to about 700° F., or from about 330 to about 550° F., or from about 540 to about 700° F. can comprise, consist of, or consist essentially of: a) at least about 40 wt %, or at least about 50 wt % cycloparaffins, and b) less than about 5, or less than about 2, or less than about 1 wt % n-paraffins and iso-paraffins.

Such bio-distillate composition can be used as at least a portion of the second component of the distillate mixture described above. Also, the bio-distillate composition can be obtained from any source capable of producing such a composition as described above, and including any one or more of the optional features of the bio-distillate composition disclosed below.

More specifically, the bio-distillate composition can be obtained from the conversion of biomass and/or lipids by a conversion process including, but not limited to, thermo-catalytic, gasification, enzymatic, fast or slow pyrolysis, hydrothermal, and liquefaction.

Further, the bio-distillate composition can be obtained from the conversion of biomass and/or lipids by a conversion process comprising transesterification and fermentation to form alcohol which may be dehydrated and oligomerized, with or without isomerization.

The bio-distillate composition can also optionally further comprise less than about 1 wt % oxygen and/or optionally less than about 20 ppm sulfur.

The cycloparaffins of the bio-distillate composition can optionally be selected from the group consisting of monocycloparaffins, dicycloparaffins, and combinations thereof; and the monocycloparaffins can optionally be present in an amount of at least about 5, or at least about 7 wt %; and the dicycloparaffins can optionally be present in an amount of at least about 20, or at least about 25 wt %.

The cycloparaffins optionally present in the bio-distillate composition can comprise substituted and non-substituted 1-ring cyclohexanes and substituted and non-substituted 2-ring decalins. The substituted and non-substituted 1-ring cyclohexanes can optionally be present in the bio-distillate composition in an amount of at least about 5, or at least about 7 wt %; and the substituted and non-substituted 2-ring decalins can optionally be present in the bio-distillate composition in an amount of at least about 20, or at least about 25 wt %.

The bio-distillate composition can further optionally comprise 2-ring compounds in which one of the rings is aromatic and is selected from the group consisting of substituted and non-substituted tetralins, substituted and non-substituted indanes, and combinations thereof; which can optionally be present in an amount of at least about 15, or at least about 20 wt %.

In accordance with another embodiment of the invention, a low temperature property improving composition can be produced from the thermo-catalytic conversion of a biomass, and further can be at least partially hydrotreated.

The low temperature property improving composition is capable of improving a low temperature property value of a distillate component selected from the group consisting of: a petroleum distillate, distillate range hydrocarbons produced by a Fischer-Tropsch process, hydroprocessed esters an fatty acids and mixtures thereof.

The low temperature property improving composition can comprise, consist of, or consist essentially of the bio-distillate fraction as described above.

The low temperature property improving composition can have a low temperature property value which is superior to the low temperature property value of the aromatic lean distillate component.

In an embodiment wherein the low temperature property is the cloud point, the cloud point value of a distillate mixture, resulting from the addition of the low temperature property improving composition to the distillate component, is lower than that predicted by the cloud point prediction method for calculating the cloud point of a mixture of fuel components as set out above.

The cloud point suppression value, which is equal to the difference between the cloud point of the distillate component and the cloud point of the distillate mixture, is at least two times greater than the cloud point suppression value predicted by the cloud point prediction method.

A distillate mixture comprising the distillate component and at least about 5 wt % of the low temperature property improving composition, based on the total weight of the distillate mixture, can have a cloud point which is at least about 3, or at least about 4, or at least about 5° F. lower than the cloud point of the distillate component.

A distillate mixture comprising the distillate component and at least about 10 wt % of the low temperature property improving composition, based on the total weight of the distillate mixture, can have a cloud point which is at least about 5° F. lower than the cloud point of the distillate component.

Also, a distillate mixture comprising the distillate component and at least about 15 wt % of the low temperature property improving composition, based on the total weight of the distillate mixture, can have a cloud point which is at least about 7° F. lower than the cloud point of the distillate component.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units except as may otherwise be indicated.

EXAMPLES

Example 1

In two separate runs, southern yellow pine wood chips were converted by thermo-catalytic conversion. The liquid products were separated from the gaseous products by condensation. Each of the resulting liquid products was further separated by gravity separation to form a bio-oil phase and an aqueous phase. The bio-oil phases were separately subjected to hydrotreatment wherein at least a portion of the oxygenated compounds were deoxygenated to form a first and a second hydrotreated bio-oil. A first bio-distillate fraction having a boiling point range of from around 330 to around 700° F. was separated from the first hydrotreated bio-oil. A second bio-distillate fraction having a boiling point range of from around 330 to around 550° F. (Jet fuel range) was also separated from the first hydrotreated bio-oil. A third bio-distillate fraction having a boiling point range of from around 330 to around 550° F. (Jet fuel range) was separated from the second hydrotreated bio-oil.

Samples of the first and second bio-distillate fractions, along with a sample of a petroleum-derived commercial JP-8 distillate jet fuel ("JP-8 (1)"), were analyzed using the ASTM D2425 mass spectrometry method, and the results of such testing are shown in Table 1 below.

TABLE 1

| Hydrocarbon Group-Type | 1st Bio-Distillate Fraction (330 to 700° F.) | 2nd Bio-Distillate Fraction (330 to 550° F.) | Commercial JP-8 (1) |
| --- | --- | --- | --- |
| D2425-MS | | | |
| Paraffins (normal and iso) | <1 | <1 | 49 |
| Cycloparaffins | 54 | 50 | 30 |
| Alkylbenzenes | 9 | 16 | 13 |
| Indanes and | 23 | 30 | 5.8 |

TABLE 1-continued

| Hydrocarbon Group-Type | 1st Bio-Distillate Fraction (330 to 700° F.) | 2nd Bio-Distillate Fraction (330 to 550° F.) | Commercial JP-8 (1) |
| --- | --- | --- | --- |
| Tetralins | | | |
| Indenes and $C_nH_{2n-10}$, where n > 8 | 8 | 3.0 | 0.6 |
| Naphthalene | <0.3 | <0.3 | <0.3 |
| Alkyl Naphthalenes | 3 | 1.2 | 1.0 |
| Acenaphthenes | 2 | <0.3 | <0.3 |
| Acenaphthylenes | <0.1 | <1 | <0.3 |
| Tricyclic Aromatics | <0.3 | <0.3 | <0.3 |
| Total | 100 | 100 | 100 |

Samples of the second bio-distillate fraction, the third bio-distillate fraction, commercial JP-8 (1), and other commercial JP-8 and Jet A distillate materials were also analyzed using two-dimensional gas chromatography (GC×GC), and results of such testing are shown in Table 2 below.

TABLE 2

| Hydrocarbon Group-Type | 2nd Bio-Distillate Fraction (330 to 550° F.) | 3rd Bio-Distillate Fraction (330 to 550° F.) | Jet A (1) | Jet A (2) | JP-8 (1) | JP-8 (2) |
| --- | --- | --- | --- | --- | --- | --- |
| GC × GC (mass %) | | | | | | |
| n-Paraffins | 0.2 | 0.1 | 25.1 | 10.1 | 18.8 | 5.4 |
| Iso-Paraffins | 0.4 | 0.3 | 32.8 | 20.6 | 31.7 | 13.4 |
| Monocycloparaffins | 15.8 | 16.6 | 18.7 | 32.4 | 20.6 | 42.8 |
| Dicycloparaffins | 31.2 | 31.4 | 3.3 | 10.7 | 5.7 | 20.2 |
| Tricycloparaffins | 6.5 | 3.4 | <1 | <1 | <1.0 | <1 |
| Alkylbenzenes | 17.0 | 14.5 | 16.9 | 14.7 | 17.4 | 11.0 |
| Indanes and Tetralins | 26.8 | 31.8 | 2.9 | 9.4 | 4.1 | 7.0 |
| Naphthalene | 0.1 | 0.1 | 0.1 | 0.2 | 0.1 | <0.1 |
| Alkyl Naphthalenes | 2.0 | 1.8 | 0.2 | 2.0 | 1.6 | 0.3 |
| Total | 100 | 100 | 100 | 100 | 100 | 100 |

The data in Tables 1 and 2 shows that the inventive bio-distillate fractions have significantly higher cycloparaffin concentrations, significantly lower paraffin concentrations, and significantly higher combined concentrations of indanes and tetralins as compared to the commercial JP-8 and Jet A materials.

Also, the data in Table 2 shows that the Jet Fuel range bio-distillates (second and third bio-distillate fractions) have significantly higher dicycloparaffin concentrations as compared to the commercial JP-8 and Jet A materials.

Cloud points were measured, using the ASTM D2500 method, for various mixtures of a petroleum distillate and the first bio-distillate fraction, and the results of such are presented in Table 3 below. Also, cloud points were predicted for the same mixtures using the cloud point prediction method described above, and such predictions are also presented in Table 3 below.

TABLE 3

| 1st Bio-distillate in Mixture (wt %) | Cloud Point (° F.) | | Cloud Point Suppression | | Suppression Ratio |
|---|---|---|---|---|---|
| | Predicted | Observed | Predicted | Observed | Obs.:Pred. |
| 0 | 3.20 | 3.2 | 0.0 | 0.0 | N/A |
| 5 | 2.04 | −2.2 | 1.2 | 5.4 | 4.5 |
| 10 | 0.82 | −4.0 | 2.4 | 7.2 | 3 |
| 15 | −0.46 | −5.8 | 3.7 | 9.0 | 2.4 |
| 100 | −77 | −77 | 0 | 0 | N/A |

As can be seen from the data in Table 3, the first bio-distillate fraction has an incredibly low cloud point, making it an excellent blendstock for distillate mixtures. As an added benefit, the data in Table 3 also shows that the addition of the inventive bio-distillate of the current disclosure to a petroleum distillate results in an unexpectedly lower cloud point for the mixture of the present disclosure than is predicted by the cloud point prediction method described above. In fact, the observed cloud point suppressions for the various mixtures were from about 2.4 to about 4.5 times the predicted cloud point suppression values, which reveal the novelty and inventiveness of the current disclosure.

Example 2

This Example tested the volume swell of O-rings by optical dilatometry at room temperature. The O-rings were composed of nitrile rubber (N0602), fluorosilicone (L1120), and fluorocarbon (V0747) and were manufactured by Parker Hannifin. The plasticizer was removed from examples of the N0602 nitrile rubber using acetone extraction and designated N0602e. For each analysis two size −001 O-rings were cut in half with one section from each O-ring being used for the analysis.

The volume swell of the O-rings was measured placing the samples in a reservoir along with 10 mL of the test fuel. Starting at 2 minutes after being immersed in the fuel the samples were digitally photographed every 20 seconds for the next 3 minutes. At 6 minutes total elapsed time the samples were photographed every 60 minutes for the next 40 hours. After the aging period was completed the cross-sectional area was extracted from the digital images and taken as a characteristic dimension proportional to the volume. The results reported below are the average values obtained from the two samples.

The prediction interval is a statistical estimate for the range of values that would be exhibited by 90% of all individual JP-8s and therefore reflects the estimated range of behavior for JP-8s with 10%-25% aromatics.

The O-ring swell results (%v/v) are summarized below in Table 6.

TABLE 6

| Material ID | Material | JP-8 90% Prediction Interval | | | POSF 8123 |
|---|---|---|---|---|---|
| | | LL % v/v | Mean % v/v | UL % v/v | % v/v |
| N0602e* | Nitrile Rubber | 16.38 | 21.43 | 26.54 | 25.38 |
| N0602 | Nitrile Rubber | 3.39 | 6.92 | 10.52 | 10.71 |
| L1120 | Fluorosilicone | 5.01 | 5.95 | 6.92 | 5.74 |
| V0747 | Fluorocarbon | 0.19 | 0.44 | 0.69 | 0.39 |

TABLE 6-continued

| Material ID | Material | JP-8 90% Prediction Interval | | | POSF 8123 |
|---|---|---|---|---|---|
| | | LL % v/v | Mean % v/v | UL % v/v | % v/v |

*Plasticizer pre-extracted

Table 6 shows that the volume swell behavior of the present invention (POSF 8123) is within the normal range normally observed for JP-8 for the fluorosilicone and fluorocarbon O-ring materials. The volume swell of nitrile rubber was near the upper limit of the range normally observed for JP-8, likely due to the 25% aromatic content of the blend. The volume swell character of the POSF 8123 is comparable to the range typically observed for a high-aromatic JP-8 and should therefore be compatible with the O-ring materials used here.

Example 3

Elastomer testing was performed on nitrile rubber (N0602), fluorosilicone (L112) and fluorocarbon (V0747) in a similar manner to that set forth in Example 1. The volume change showed little effect of the POSF 8123 blend was noted for fluorocarbon and fluorosilicone O-rings while volume swell was noted with nitrile O-rings. Volume swell was noted to increase significantly with the aromatic level of the fuel, with 15 and 20% aromatic fuel having about 70% the volume swell observed with the POSF 8123 blend. It can be concluded that nitrile O-rings tend to be most susceptible to shrinkage.

Example 4

Stress-relaxation tests were performed using an Elastocon Relaxation Tester EB 02 following the test method "A" of ISO 3384. In each experiment, standard nitrile O-rings (AS568 113 size) were first aged under standard stress relaxation test conditions (25% compression, 30° C.) in Jet A. After 160 hours, the fuel was switched to the POSF 8123 blend and the aged O-rings were then tested under the same relaxation conditions. Ft/F0 (force at time t divided by the initial force) was calculated to evaluate how fast each compression counterforce relaxed with time (due to O-ring shrinkage). Additionally in order to compare the relaxation characteristics of each fuel with the Jet A, for each fuel at each time increment its Ft/F0 value was divided by the corresponding Ft/F0 value of the reference Jet A fuel. Note that slight undulations of the relaxation curves are caused by ambient temperature fluctuations. FIG. 1 shows the stress relaxation characteristics at 85° F. of the aged nitrile O-rings varied with fuel composition. Unlike fresh nitrile O-rings which initially experience swell (counterforce increases) continued exposure to Jet A fuel leads to a slight reduction in the counterforce as the material relaxes (red curve). It is believed that this is due to the plasticizers and other soluble components in the O-ring being "washed out" with Jet A.

When the second bio-distillate of Example 1 was present in the blends, a certain amount of swelling was observed. This was beneficial as it created a counterforce increase (i.e. a tighter seal). The amount of swelling increased as the percentage of product in the blends increased. This indicates that Example 1 behaved similar to model aromatic compounds that have an ability to penetrate into the nitrile O-ring structure. The normalized final force was measured after 160 hours for both the distillate fuel and Example 1. As a result of the swelling, the relaxation processes were slowed down significantly. It was concluded that as more Example 1 product was blended into the jet fuel, the slower the O-ring relaxed demonstrating improved sealing performance. After 160 hours, the relaxation characteristic of aged nitrile O-ring was seen to be enhanced by 40% in Example 1 compared to that of pure Jet A. Comparison in the blends also proved Example 1 product enhanced the O-ring swelling property of Jet A fuel. FIG. 1 further illustrates that the degree of stress relaxation of the nitrile O-ring is linearly reduced as the proportion of Example 1 product in the distillate blend. Example 1 thus assisted in the prevention of fuel system leaks stemming from a reduction in the counterforce exerted by nitrile O-rings that can occur with highly iso-paraffinic jet fuel.

Example 5

Biomass containing southern yellow pine wood chips were converted by thermo-catalytic conversion and the liquid products were separated from the gaseous products by condensation. Each of the resulting liquid products was further separated by gravity separation to form a bio-oil phase and an aqueous phase. The bio-oil phases were separately subjected to hydrotreatment wherein at least a portion of the oxygenated compounds were deoxygenated to form a first and a second hydrotreated bio-oil. The bio-distillate fraction having a boiling point range between from about 540° F. to about 700° F. (diesel fuel range) was separated. Analysis was then conducted on a commercially available Ultra Low Sulfur Diesel (ULSD) fuel and a blend containing the ULSD and 5 volume % of the bio-distillate fraction (meeting ASTM D975 specifications for diesel fuel). The results are set forth in Table 7.

TABLE 7

| Property | Diesel | Diesel 5% Distillate |
|---|---|---|
| Relative Density, @ 60/60° F. | 0.8435 | 0.8458 |
| API Gravity @ 60° F., °API | 36.2 | 35.7 |
| Sulfur, ppm mass | 9.4 | 7.9 |
| Distillation, ° F. | | |
| 0% | 354.7 | 356.2 |
| 5% | 391.7 | 389.5 |
| 10% | 407.3 | 402.6 |
| 20% | 429.2 | 425.8 |
| 30% | 449.6 | 447.1 |
| 40% | 468.1 | 468.7 |
| 50% | 485.7 | 487.8 |
| 60% | 503.9 | 507.0 |
| 70% | 524.0 | 528.8 |
| 80% | 548.7 | 554.7 |
| 90% | 584.5 | 589.8 |
| 95% | 618.7 | 619.9 |
| 100% | 651.1 | 649.9 |
| Residue, Vol % | 1.2 | 1.7 |
| Lubricity, @ 60° C., μm | 380 | 340 |
| Derived Cetane Number | 45.6 | |
| Cetane Index, 4-Var | 46.1 | 45.0 |

Combinations and sub-combinations may be made of the various components, elements, assemblies and/or ranges described herein without departing from the spirit and the scope of the disclosure as defined in the following claims. In addition, changes may be made in the construction and the operation of the various components, elements and assemblies described herein, and changes may be made in the steps or sequence of steps of the methods described herein without departing from the spirit and the scope of the disclosure as defined in the following claims.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of dispensing fuel into an internal combustion engine through dispensing equipment having an elastomeric seal, the method comprising:
   (A) introducing into the engine a distillate fuel comprising a mixture of an aromatic-lean component and an aromatic-rich component wherein the distillate fuel is prepared by mixing:
      (a) the aromatic-lean component, wherein the aromatic-lean component is selected from the group consisting of:
         (i) a renewable distillate produced by a Fischer-Tropsch process;
         (ii) a non-renewable distillate produced by a Fischer-Tropsch process; and
         (iii) a renewable component of a hydroprocessed/hydrotreated triglyceride or triglyceride derived fatty acid alkyl ester; and
      (b) the aromatic-rich component, wherein the aromatic-rich component is a hydrotreated bio-oil prepared by converting cellulosic biomass to a conversion effluent in the presence of a catalyst, separating a vapor conversion product from the conversion effluent, condensing at least a portion of the separated vapor conversion product to form a condensate comprising a bio-oil fraction and water and then hydrotreating the bio-oil fraction to remove at least 95% of the oxygen from the bio-oil fraction
   wherein the boiling range of the aromatic-lean component and the aromatic-rich component are about the same;
   (B) swelling the elastomeric seal, wherein the amount of swelling of the elastomeric seal is greater than when a fuel dispensed into the internal combustion engine does not contain the mixture of the aromatic-lean component and the aromatic-rich component.

2. The method of claim 1, wherein the non-renewable distillate produced by a Fischer-Tropsch process is gasoline, jet fuel or diesel fuel.

3. The method of claim 1, wherein the amount of aromatic hydrocarbons in the aromatic-rich component is from 30% to about 50%.

4. The method of claim 1, wherein the amount of aromatic hydrocarbons in the aromatic-lean component is less than 20%.

5. The method of claim 1, wherein the amount of aromatic-rich component in the distillate fuel is from about 10% to about 50%.

6. The method of claim 1, wherein the energy density (BTU/Gal) of the distillate fuel is greater than the energy density (BTU/Gal) of the aromatic-lean component.

7. The method of claim 1, wherein the distillate fuel meets the specifications of ASTM D4814, D975 or D7566.

8. The method of claim 1, wherein the hydrotreated bio-oil fraction contains less than 5 ppm sulfur.

9. The method of claim 1, wherein the elastomer of the elastomeric seal is a nitrile rubber, fluorosilicone or fluorocarbon.

10. A method of dispensing fuel into an internal combustion engine through dispensing equipment having an elastomeric seal, the method comprising:
(I) introducing into the engine a distillate fuel meeting the specifications of ASTM D4814, D975 or D7566, the distillate fuel comprising an aromatic-lean component and an aromatic-rich component, the distillate fuel prepared by mixing:
a) the aromatic-lean component, wherein the aromatic-lean component is selected from renewable and non-renewable distillates produced by a Fischer-Tropsch process or a renewable component of a hydroprocessed/hydrotreated triglyceride or triglyceride derived fatty acid alkyl ester, and
b) the aromatic-rich component, wherein the aromatic-rich component comprises a hydrotreated bio-distillate fraction produced from the conversion of biomass to a conversion effluent at an elevated temperature and wherein the hydrotreated bio-distillate fraction comprises at least 15 weight percent of at least one of the following: substituted tetralins, non-substituted tetralins, substituted indanes or non-substituted indanes
wherein the boiling range of the aromatic-lean component and the aromatic-rich component are about the same and wherein both of the following conditions prevail:
(iii) the amount of aromatic hydrocarbons in the aromatic-rich component is from about 30 percent to about 50% and the amount of aromatic hydrocarbons in the aromatic-lean component is less than 20% ;
(iv) the amount of aromatic-rich component in the distillate fuel is from about 10% to about 50% ; and
(II) expanding the elastomer and swelling the elastomeric seal, wherein the amount of swelling of the elastomeric seal is greater than when a fuel dispensed into the internal combustion engine does not contain the aromatic-lean component and the aromatic-rich component.

11. The method of claim 10, wherein the biomass is converted to the conversion effluent over a catalyst.

12. The method of claim 11, wherein the catalyst comprises a zeolite.

13. The method of claim 10, wherein the aromatic-lean component of (i) is prepared by gasification of a biomass, subjecting the resulting syngas product to a Fischer-Tropsch synthesis and then subjecting the resulting product to fractionation.

14. The method of claim 10, wherein the aromatic-lean component of (ii) is prepared by subjecting peat, lignin, coal, oil shale, tar sand or a petroleum source to gasification, subjecting the resulting syngas product to a Fischer-Tropsch synthesis and then subjecting the resulting product to fractionation.

15. The method of claim 10, wherein the aromatic-lean component is a hydroprocessed/hydrotreated triglyceride from a fat or oil.

16. The method of claim 10, wherein the aromatic-lean component is a hydroprocessed/hydrotreated fatty acid alkyl ester.

17. The method of claim 10, wherein the aromatic-lean component is diesel fuel.

18. The method of claim 10, wherein the aromatic-lean component is jet fuel.

19. The method of claim 10, wherein the aromatic-lean component is gasoline.

20. The method of claim 10, wherein the lubricity performance of the distillate fuel is improved over the lubricity performance of the aromatic-lean component.

21. The method of claim 10, wherein the aromatic-lean component has a boiling point range of from about 320 to about 700° F., and the aromatic-rich component has a boiling point range of from about 320 to about 700° F.

22. The method of claim 10, wherein the aromatic-lean component has a boiling point range of from about 330 to about 550° F., and the aromatic-rich component has a boiling point range of from about 330 to about 550 ° F.

23. The method of claim 10, wherein the aromatic-lean components has a boiling point range of from about 480° F. to about 660° F., and the aromatic-rich component has a boiling point range of from about 480° F. to about 660° F.

24. The method of claim 10, wherein the aromatic-lean component has a boiling range of from about 320 to about 700° F. and comprises (a) at least about 40 wt % cycloparaffins, and (b) less than about 5 wt % n-paraffins plus iso-paraffins.

25. The method of claim 10, wherein the energy density (BTU/Gal) of the distillate fuel is greater than the energy density (BTU/Gal) of the aromatic-lean component and the lubricity of the distillate fuel is greater than the lubricity of the aromatic-lean component.

26. The method of claim 10, wherein the biomass is converted to the conversion effluent in the presence of a heat carrier other than a catalyst and further comprising partially hydrotreating the condensate comprising the bio-oil fraction and water, separating the bio-oil fraction and water and then hydrotreating at least a portion of the bio-oil fraction.

27. The method of claim 10, wherein the non-renewable distillate produced by a Fischer-Tropsch process is gasoline, jet fuel or diesel fuel.

28. The method of claim 10, wherein the elastomer of the elastomeric seal is a nitrile rubber, fluorosilicone or fluorocarbon.

29. A method of dispensing a jet fuel into an internal combustion engine through dispensing equipment having an elastomeric gasket seal, the method comprising:
(A) introducing into the engine a distillate jet fuel comprising:
(a) an aromatic-lean component having a boiling range of from about 320 to about 700° F. and comprising at least about 40 wt % cycloparaffins and less than about 5 wt % n-paraffins plus iso-paraffins and wherein the aromatic-lean component contains less than 20% aromatic hydrocarbons and is selected from the group consisting of:
a renewable distillate produced by a Fischer-Tropsch process;

(ii) a non-renewable distillate produced by a Fischer-Tropsch process; and
(iii) a renewable component of a hydroprocessed/hydrotreated triglyceride or triglyceride derived fatty acid alkyl ester; and
(b) from about 10 to about 50% of an aromatic-rich component comprising a hydrotreated bio-distillate fraction, the aromatic-rich component having from about 30 to 50 percent of aromatic compounds and at least 15 wt. % of 2-ring compounds selected from the group consisting of substituted and non-substituted indanes, substituted and non-substituted tetralins and combinations thereof
and wherein the boiling range of the aromatic-lean component and the aromatic-rich component are about the same;
(B) expanding the elastomer of the elastomeric gasket seal and swelling the elastomeric gasket seal
wherein the amount of swelling of the elastomeric gasket seal is greater than the swelling when the jet fuel introduced into the internal combustion engine is a petroleum derived distillate fuel having a lower concentration of cycloparaffins, higher concentration of paraffins and lower concentration of indanes and tetralins than the distillate jet fuel.

30. The method of claim 29, wherein the hydrotreated bio-distillate fraction contains less than about 20 ppm sulfur.

31. The method of claim 29, wherein the elastomer of the elastomeric gasket seal is a nitrile rubber, fluorosilicone or fluorocarbon.

32. The method of claim 29, wherein the stress relaxation of the distillate jet fuel is less than when the jet fuel introduced into the internal combustion engine is a petroleum derived distillate fuel.

33. The method of claim 29, wherein the non-renewable distillate produced by a Fischer-Tropsch process is jet fuel.

34. The method of claim 29, wherein the distillate fuel meets the specifications of ASTM D7566.

35. The method of claim 29, wherein the cycloparaffins comprises dicycloparaffins and further wherein the amount of dicycloparaffins in the aromatic-lean component is at least about 25 wt. %.

36. The method of claim 29, wherein the aromatic-rich component contains at least 20 wt. % of substituted and non-substituted indanes, substituted and non-substituted tetralins and combinations thereof.

* * * * *